March 15, 1960 R. H. VARIAN 2,929,018
GRADIOMETER
Filed May 11, 1954 2 Sheets-Sheet 1
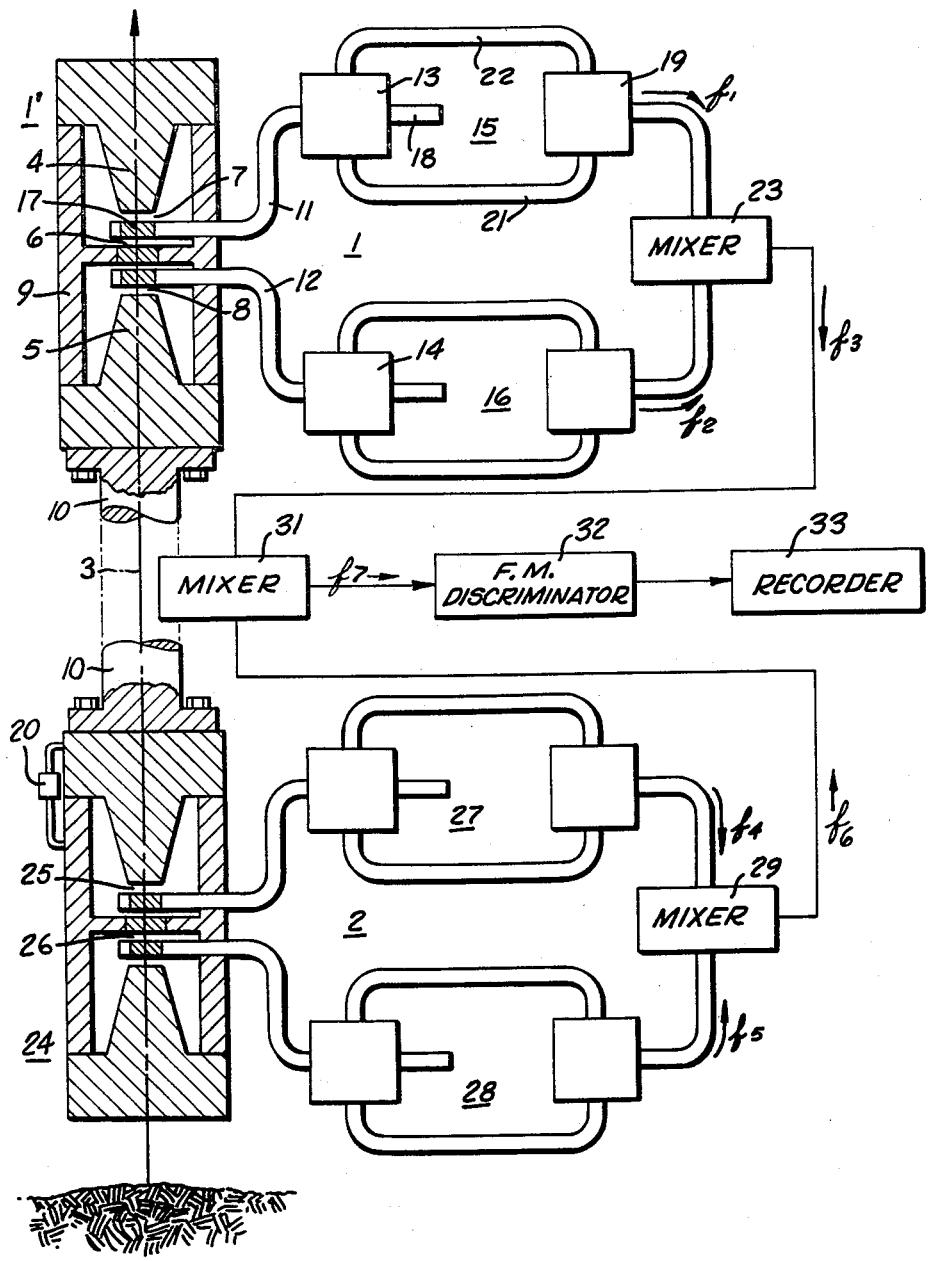
FIG_1
Russell H. Varian
INVENTOR.
BY Paul B. Hunter
ATTORNEY

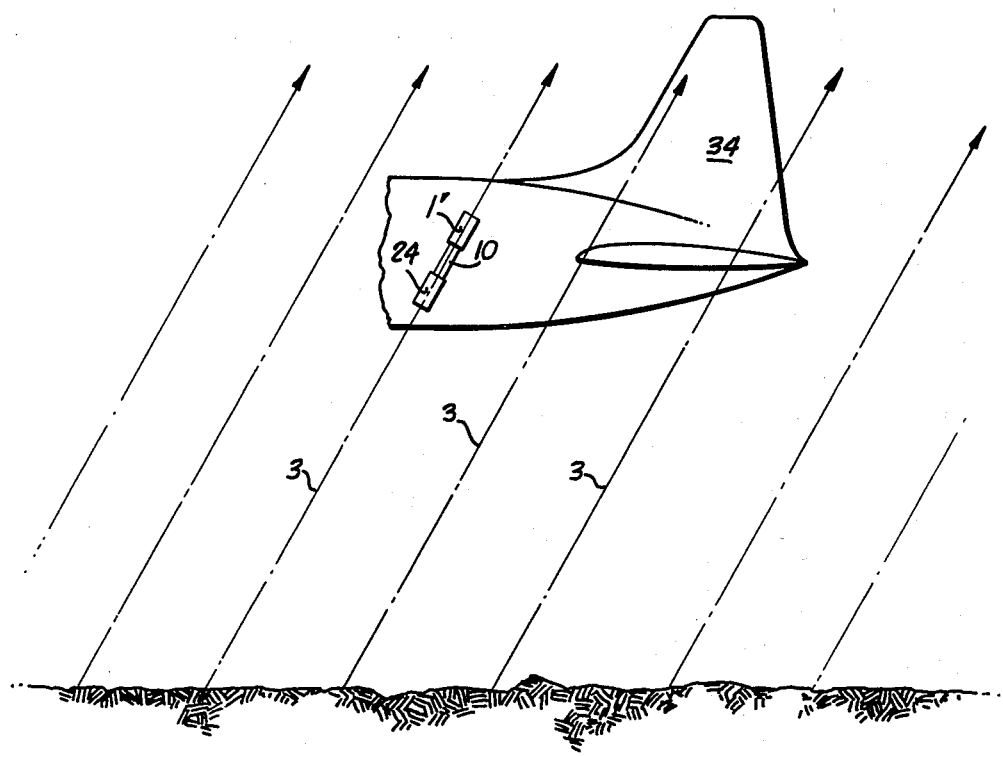
FIG_2

United States Patent Office

2,929,018
Patented Mar. 15, 1960

2,929,018

GRADIOMETER

Russell H. Varian, Cupertino, Calif., assignor to Varian Associates, San Carlos, Calif., a corporation of California Application May 11, 1954, Serial No. 429,018

3 Claims. (Cl. 324—.5)

This invention relates in general to magnetic field measuring methods and apparatus and more particularly to a novel method and apparatus utilizing gyromagnetic resonance for measuring magnetic field gradients along the lines of force of magnetic fields such as the earth's magnetic field.

There are various methods and apparatus presently known for measuring magnetic fields, one of which is the gyromagnetic resonance method disclosed in the U.S. Patent No. 2,561,489, issued to F. Bloch et al. on July 24, 1951, and there are other known ways for measuring field gradients across magnetic fields. A gyromagnetic resonance method and apparatus for measuring magnetic fields and gradients is shown in applicant's copending application entitled "Gyromagnetic Resonance Magnetometer and Gradiometer," filed February 8, 1954, and bearing Serial No. 408,845. However, in present day applications for magnetic field measurements such as for geophysical exploration, there has existed the need for a method and apparatus for precisely measuring the field gradient along the lines of force of a magnetic field and in addition to measure such gradients in successive lines of field force as a particular magnetic field is crossed or traversed whereby anomalies in these gradients caused by differences in the physical properties of the earth over its subsurface or foreign objects in the field may be detected and utilized for obtaining geophysical information or locating the foreign objects.

The present invention has for its object the provision of a novel method and apparatus for measuring magnetic fields and field gradients along the lines of force of a magnetic fields and field gradients along the lines of force of a magnetic field and for making readings along successive lines of force in the field whereby the results obtained may be utilized for practical applications such as the plotting of contour maps of the gradiations along the lines of force in the earth's field for the purpose of geophysical survey studies or the locating of foreign bodies in the field.

One feature of the present invention is the provision of a novel method and apparatus whereby the field gradients along lines of force in a magnetic field may be determined.

Another feature of the present invention is the provision of a novel method and apparatus utilizing gyromagnetic resonance for measuring the strength of a magnetic field.

Still another feature of the present invention is the provision of a novel method and apparatus whereby field gradients along successive lines of force in a magnetic field may be determined and may be plotted to give contour maps and the like which are highly useful in geophysical exploration.

Still another feature of the present invention is the provision of a novel method and means for measuring field gradients whereby the requirement for maintaining the apparatus rigidly stabilized in the magnetic field is reduced by a factor of about 100 from other known methods of field measurement such as magnetic airborne detectors.

Another feature of the present invention is the reduction or elimination of the effects of naturally occurring fluctuations of the earth's magnetic field in the gradiometer readings.

Still another feature is the elimination of the requirement present in other known field measuring methods for maintaining a level altitude during airborne magnetic surveying.

Still another feature of the present invention is the accentuation of anomalies produced relatively close to the apparatus relative to distant or deep anomalies.

These and other features and advantages of the present invention will become apparent from a perusal of the following specification taken in conjunction with the accompanying drawings wherein Fig. 1 discloses one embodiment of the novel gyromagnetic resonance apparatus which is utilized in performing the field gradient measurements, Fig. 2 is a diagrammatic illustration of how the present invention may be utilized in measuring the field gradients along the lines of force of the earth's field from a rapidly moving airplane, successive lines of force being measured.

Referring now to Fig. 1 there is shown two similar pieces of apparatus 1 and 2, each located at a different point along a line of force 3 of a magnetic field which, for purposes of illustration, shall be taken to be the earth's field, the force line extending from the earth's surface as indicated by the arrow on line 3. Since the two apparatus are identical, at least in the preferred embodiment of this invention, only one will be described in detail. The apparatus 1 comprises a permanent magnet device 1' having three magnetic poles 4, 5 and 6 and two air gaps 7 and 8, pole 6 serving as a common pole to the gaps 7 and 8. The pole pieces 4, 5 and 6 are preferably made of material having a very high permeability such as an alloy iron, for example, permalloy, or a high permeability ferrite such that small magnetizing force changes will produce relatively large flux density changes in the gaps. The yoke 9 of the magnet device is preferably of a magnetic material having a high residual magnetism relative to the magnetizing flux density, that is, one having a relatively square hysteresis loop. This is desirable so that a changing magnetizing force on the magnet device will result in little flux density change in the yoke, the flux density changes thus being concentrated through the pole pieces 4, 5 and 6.

This magnet device 1' produces a magnetic field across the two gaps 7 and 8, the field in gap 7 extending downwardly and the field in gap 8 extending upwardly as viewed in Fig. 1. As above stated, this magnet apparatus is axially aligned in an external magnetic field line of force, such as the earth's, and this force is directed through the pole pieces 5, 6 and 4, thus producing an additional field across the gaps 7 and 8 directed upwardly in both cases, this field adding to the magnet field in gap 8 and subtracting from the magnet field in gap 7. The field strength between the gaps due to the earth's field may be as high as one hundred times the earth's due to the intensifying properties of the magnet. It should be understood that the particular magnet device 1' shown is only for illustration purposes and that other structures such as, for example, an electromagnet could be employed in lieu of the permanent magnet device 1', in which case identical solenoids carrying the same D.C. current would be found around each of the four yoke sections or identical coils with no iron could be used.

Positioned in each of these gaps 7 and 8 is one waveguide side-arm 11 and 12 of a pair of magic T's or hybrid junctions 13 and 14. Each of these magic T's forms a part of the feedback circuit of an associated oscillator 15 and 16 of a type such as that disclosed in a U.S. patent application bearing Serial No. 367,538, filed July 13, 1953, by Marvin Chodorow and Russell H. Varian entitled "Gyromagnetic Resonance Apparatus." One of these oscillators will be described, the upper one 15, and it is to be understood that the other oscillator is identical.

Positioned in the waveguide side arm 11 within the associated field gap 7 is a small volume 17 of a gyromagnetic substance of the paramagnetic class such as alkali metal in ammonia or diphenyl-picryl-hydrazyl. The other waveguide side arm 18 of the magic T 13 is a dummy load which is used to balance the magic T before gyromagnetic resonance occurs in the other side arm 11. With noise present at the Larmor frequency of the gyromagnetic substance in the side arm 11, gyromagnetic resonance occurs in side arm 11 resulting in an unbalancing of the magic T. When the magic T 13 is unbalanced, a portion of the output from the associated microwave amplifier 19, which, for example, may be a two cavity klystron, is transmitted through one arm 21 of the magic T and through the other arm 22 of the magic T back to the amplifier input to thereby provide a feedback circuit to the amplifier which will then oscillate. The frequency at which self-oscillations will occur is determined by the strength of the magnetic field across the gap 7, this strength determining the frequency of gyromagnetic resonance of the electrons in the paramagnetic substance 17, and this resonance frequency in turn determining the oscillation frequency of the oscillator. The frequency of oscillation is thus determined by the resultant field due to the magnet's field and the field induced across the gap due to the earth's field, assuming the earth's field to be under test. The detailed explanation of the operation of this oscillator is set forth in the above cited patent application Serial No. 367,538. The lower oscillator 16 operates in a similar manner to oscillator 15, the frequency of oscillation being determined by the field strength across gap 8.

The radio frequency output $f_1$ from oscillator 15 will be different than the radio frequency output $f_2$ from oscillator 16 since the resultant magnetic field across gap 8 is stronger than the resultant magnetic field across gap 7. The frequency difference between the frequencies of signals $f_1$ and $f_2$ will be proportional to twice the earth's field at the midpoint between gap 7 and 8 since the earth's field is added to the magnet field in one gap and subtracted in the other. The difference in the frequency output of the two oscillators 15 and 16 may be easily obtained by supplying the output from each of these oscillators to a mixer 23 where the two radio frequency signals $f_2$ and $f_1$ are "beat," the value of the frequency of the difference or beat frequency signal $f_3$ obtained being proportional to the strength of the earth's magnetic field at the midpoint between the gaps 7 and 8.

To give a concrete example, the gyromagnetic resonance frequency of electrons in a typical paramagnetic substance is $3.6 \times 10^6$ cycles per second per gauss. Since the earth's field is approximately ½ gauss and since the ferromagnetic core increases it by, say, a factor of 100, the gyromagnetic resonance frequency in each paramagnetic substance in the arms 11 and 12 due to the earth's field is $3.6 \times 10^6 \times 50$. Since the gyromagnetic frequency in each substance due to the field produced by the magnet cancel out in the mixer 23, the difference frequency of the output $f_3$ from the mixer is twice the gyromagnetic resonance frequency in each arm due to the field induced therein by the earth's field. Thus, in this illustration, the output frequency from the mixer 23 will be $3.6 \times 10^6 \times 50 \times 2$ or $3.6 \times 10^8$ cycles/sec.

It should be noted that the results are given in terms of frequency and changes in frequency which are a great deal more accurate and reliable than readings in current, voltage and the like. It should also be noted that the difference frequency will vary only as a second order function of the departure of the magnet structure 1' from direct alignment in the line of force 3 of the field.

The lower apparatus 2 operates in a manner similar to the apparatus 1, the magnet device 24 being located in axial alignment with the magnet device 1' in the line of force of the earth's field, the two devices 1' and 24 being positioned a selected distance apart, for example two feet. The apparatus 1' and 24 are preferably fixedly mounted on a common base or framework 10 so that the relative spacing and exact alignment will be maintained.

In this embodiment the magnetic field across gaps 25 and 26 due to the magnet 24 is the same as the magnetic field across gaps 7 and 8 produced by the magnet 1' above. A suitable fine-adjusting metal member 20 is slidably mounted on the magnet 24 so that the magnetic fields across gaps 26 and 25 may be changed slightly if desired to bring them into balance with the fields of magnet 1'. The earth's field strength at the midpoint between gaps 7 and 8 is different from the earth's field strength at the midpoint between the gaps 25 and 26 since the strength of the earth's field decreases with increasing distance from the earth.

Thus, the field strength due to the earth's field at the midpoint between gaps 25 and 26 is greater than the field strength due to the earth's field at the midpoint between gaps 7 and 8. The field in gap 25 due to the earth's field subtracts from the magnet's field in gap 25 and adds to the magnet's field in gap 26. Since the earth's field is larger at magnet apparatus 24, the resultant field across gap 26 is larger than the resultant fields across either gaps 7 or 8 while the resultant field across gap 25 is smaller than the resultant fields across gaps 7 or 8. Thus, the frequency of signal $f_4$ of oscillator 27 is less than the frequency of signals $f_1$ or $f_2$ while the frequency of signal $f_5$ of oscillator 28 is greater than the frequency of signals $f_1$ or $f_2$. The frequency of difference signal $f_6$ between the signals $f_4$ and $f_5$ as obtained from the mixer 29 is thus greater than the frequency obtained from the mixer 23. The signals $f_3$ and $f_6$ are transmitted to another mixer 31 where the two signals are beat together to give a difference frequency output signal $f_7$.

The difference frequency of signal $f_7$ is a measure of the difference between the strength of the earth's magnetic field at the midpoint between gaps 7 and 8 and the strength of the earth's magnetic field at the midpoint between the gaps 25 and 26.

Returning to the example above, the earth's field at device 1' was assumed to be ½ gauss. The earth's field at the midpoint between gaps 25 and 26 is then ½ gauss plus a certain amount which is dependent on the gradient along the line of force. A representative field gradient would be about 50 gammas per mile, one gamma equalling $10^{-5}$ gauss. Since the distance between the midpoints is 2 feet, the gradient along the two feet is roughly $2 \times 10^{-2}$ gammas or $2 \times 10^{-7}$ gauss. The earth's field between gap 25 and 26 is thus ½ gauss plus $2 \times 10^{-7}$ gauss. Following through with the same reasoning as above in arriving at the output frequency of mixer 23, the output frequency from the mixer 29 will be $3.6 \times 10^8 + 144$ cycles/sec. Thus the difference frequency of signal $f_7$ is 144 cycles/sec.

The output signal $f_7$ from the mixer 31 may be transmitted to a standard type F.M. discriminator 32 which will give a D.C. voltage output, the magnitude of which will be proportional to the frequency of the signal $f_7$. This D.C. voltage output may then be transmitted to a suitable recorder 33 for permanent recording. This is only one illustration of a way for recording the results. Many other ways will be evident to those skilled in the electronics art.

The output signal $f_7$ obtained when the magnet apparatus 1' and 24 are aligned in the line of force 3 may be equal to or different from the frequency of the output signal $f_7$ obtained when the magnet apparatus is moved to alignment in another line of force of the earth's field, depending on whether or not the difference or gradient in field strength between equally spaced points in the two lines of force is equal. Therefore, anomalies in the field differences between equally spaced points in different lines of force will be indicated by differences in the frequency of the output signals and, since these anomalies are due in major part to the differences in electrical conductivity and magnetic susceptibility in the rock formations and the like beneath the respective force lines, there is provided a valuable tool in geophysical prospecting.

Assume that the magnet devices 1' and 24 are aligned in a line of force different from line 3, the distance between devices 1' and 24 remaining the same. Assume also that the field strength at the midpoint between gaps 25 and 26 is the same in the new line of force as in line 3 but that the field gradient in the new line is greater than the field gradient in line 3. That is to say, the field strength at the midpoint between gaps 7 and 8 in the new line of force is less than the field strength at the like point in line 3. Under these conditions, the output signals $f_4$ and $f_5$ will be of the same frequency as when the apparatus 24 was in line of force 3 but the frequencies of outputs $f_1$ and $f_2$ will be different for the following reason. The resultant field strength across gap 8 will be less in the new line of force than in line 3 while the resultant field strength across gap 7 will be greater since there is less earth's field to add in gap 8 and oppose in gap 7. Therefore, the frequency of $f_1$ will be higher than previously while the frequency of $f_2$ will be less than previously. The difference frequency $f_3$ will therefore be less than when the apparatus was positioned in line of force 3. Following from this, the difference frequency of $f_7$ will be greater with the equipment in the new force line than in line 3. It can thus be seen that increasing frequency outputs $f_7$ indicate increasing field gradients and vice versa.

Returning to the illustration, assume the gradient in the new line of force is 40 gammas per mile as distinguished from the 50 gammas per mile assumed in force line 3. The gradient across the two feet in this instance would be roughly $1.6 \times 10^{-7}$ gauss. From this it can be calculated that the output frequency from the mixer 29 will be $3.6 \times 10^8 \times (\frac{1}{2} + 1.6 \times 10^{-7}) \times 100 \times 2$ which equals $3.6 \times 10^8 + 115$ cycles/sec. Thus the difference frequency $f_7$ is 115 cycles per second. Thus, as this apparatus including the magnet devices 1' and 24 is moved through subsequent lines of force, a D.C. voltage recording may be obtained which will be a measure of the difference in field gradients along the lines of force and, if the path of the movements is noted and recorded in any of the known manners, a contour map revealing these varying gradients along the lines of force may be plotted.

Fig. 2 is a diagrammatic illustration showing the magnet devices 1' and 24 of a gradiometer of the type shown in Fig. 1 positioned in an airplane 34 so that they are aligned with the lines of force of the earth's magnetic field. The recorded data may then be utilized in plotting a contour map of the terrain covered showing the variations in magnetic field gradients and thus spotlighting the magnet anomalities in the earth's field.

It should be noted that one of the main advantages of measuring field gradients along lines of force of the earth's magnetic field lies in the fact that although the magnetic field difference or gradient between two points may be small compared to the actual field at either point, and therefore a more sensitive instrument is required to measure gradients, the ratio of that portion of the gradient produced between the points due to an anomaly in the earth's field to that portion of the gradient due to the earth's field itself is relatively large. This is due to the fact that the field (F) produced by a magnetic dipole is proportional to $$\frac{1}{r^3}$$

where $r$ is the distance between poles while the gradient is proportional to $\frac{dF}{dr}$ $$\frac{1}{r^4}$$

and since the effective distance of the earth's dipole is some thousands of times farther away from the gradiometer apparatus than the dipole producing the anomaly in the field, the effect of the anomaly is some thousands of times greater relatively when the gradients are compared than when the fields themselves are compared. Because of this, the variations in the altitude of the airplane as the gradiometer readings are made is of practically no consequence. Also, stabilization, that is alignment of the magnet devices 1' and 24 in the lines of force, varies only as a second order function of the departure from alignment and in the present invention is only a factor of one one-hundredth ($\frac{1}{100}$) as critical as stabilization in presently used magnetic airborne detectors. Also, fluctuations in the earth's field such as secular variations, solar diurnal variations, lunar diurnal variations, and the more rapid fluctuations or naturally occurring changes will not noticeably affect the gradiometer readings since the effects due to the changes in the earth's field at the two points will be substantially canceled out.

Since various modifications may be made in the described method and apparatus without departing from the spirit of the invention, such as, for example, the use of an arrangement of field controlled bridges in lieu of the oscillator equipment shown in Fig. 1, it is intended that the foregoing description is to be considered as exemplary and not in a limiting sense.

What is claimed is:

1. In combination, means for producing a first pair of mutually aligned magnetic fields having equal intensities, said fields extending in opposite directions such that when said means is placed in a third magnetic field substantially aligned with said pair of fields and extending in one of said directions, one of said pair of magnetic fields is increased proportionally to said third field while the other of said pair of magnetic fields is decreased, two volumes of matter having portions of atoms having the properties of magnetic moment and gyroscopic moment, each volume being within a different one of said pair of aligned magnetic fields, means for producing a second pair of mutually aligned magnetic fields having equal intensities, said second pair of fields extending in opposite directions such that when said means is placed in said third magnetic field such that said second pair of fields is substantially aligned with said third magnetic field and said first pair of magnetic fields one of said second pair of magnetic fields is increased proportionally to said third field while the other of said second pair of magnetic fields is decreased, two other volumes of matter having portions of atoms having the properties of magnetic moment and gyroscopic moment, each of said latter two volumes being within a different one of said second pair of aligned magnetic fields, means for producing Larmor precession of the atom portions in each of the four volumes of matter, the strength of the respective magnetic fields determining the frequency of precession of the portions of atoms in each volume, and means associated with each of said four volumes of matter for producing radio frequency output signals proportional to the frequencies of precession of the gyromagnetic portions of atoms in each volume of matter.

2. A combination as claimed in claim 1 wherein said means for producing said radio frequency signals comprises four radio frequency oscillators coupled to separate ones of said volumes of matter whereby the oscillating frequency of each oscillator is determined by the frequency of precession of the gyromagnetic portions of atoms in its associated volume of matter.

3. Apparatus for determining field gradients along a line of force of a magnetic field which comprises means for locating at a first point in the line of force a first and second volume of matter containing portions of atoms having gyromagnetic properties aligned in the line of force and positioned close to each other, means for applying a second magnetic field to one of said volumes adding to the first field to thereby produce a first resultant field and for applying a third magnetic field equal to said second magnetic field to the other of said volumes opposed to the first magnetic field to thereby produce a second resultant field, means for producing gyromagnetic resonance of the atom portions in each volume, the frequency of resonance in each volume being determined by the strength of the respective resultant fields, the difference in resonance frequencies being a measure of the strength of the first field at that point in the line of force, means for locating a third and fourth volume of matter containing portions of atoms having gyromagnetic properties at a point a known distance from the point of the other two volumes of matter aligned in the line of force and positioned close to each other, means for applying a fourth magnetic field to said third volume adding to the first field to thereby produce a third resultant field and for applying a fifth magnetic field equal to said fourth magnetic field to said fourth volume opposing the first magnetic field to thereby produce a fourth resultant field, and means for producing gyromagnetic resonance of the atom portions in each said third and fourth volumes, the frequency of resonance in each volume being determined by the strength of the respective resultant fields, the difference in resonance frequencies being a measure of the strength of the first field at the respective point in the line of force, the differences in the strength at the two points serving to indicate the field gradient along the line of force.

References Cited in the file of this patent
UNITED STATES PATENTS

| | | |
|---|---|---|
| 2,382,743 | Penther et al. | Aug. 14, 1945 |
| 2,500,186 | Kline | Mar. 14, 1950 |
| 2,520,677 | Fearon | Aug. 29, 1950 |
| 2,561,490 | Varian | July 24, 1951 |
| 2,620,381 | Mayes et al. | Dec. 2, 1952 |
| 2,642,479 | Jones | June 16, 1953 |
| 2,663,843 | Wickerham et al. | Dec. 22, 1953 |
| 2,671,275 | Burns | Mar. 9, 1954 |
| 2,693,590 | Schmitt | Nov. 2, 1954 |
| 2,709,783 | Hare | May 31, 1955 |